United States Patent [19]

Rubio et al.

[11] 4,383,955

[45] May 17, 1983

[54] PROCESS FOR FABRICATING A CLOSED, FOAM-FILLED, REINFORCED POLYESTER RESIN SHELL ARTICLE

[76] Inventors: Marcelino Rubio, 7336 Bequette Ave., Pico Rivera, Calif. 90660; James A. Mizell, 14482 Shattle La., Huntington Beach, Calif. 92646

[21] Appl. No.: 295,609

[22] Filed: Aug. 24, 1981

[51] Int. Cl.³ .............................................. B29D 27/04
[52] U.S. Cl. .................................... 264/46.6; 249/160; 249/163; 264/138; 264/250; 264/257; 264/269; 441/74
[58] Field of Search ....................... 264/46.6, 138, 250, 264/257, 269; 9/310 E, 310 R, 311; 249/160, 163

[56] References Cited

U.S. PATENT DOCUMENTS

| | | | |
|---|---|---|---|
| 2,753,642 | 7/1956 | Sullivan | 264/46.6 X |
| 2,870,793 | 1/1959 | Bailey | 264/46.6 X |
| 3,487,134 | 12/1969 | Burr | 264/46.6 |
| 3,673,617 | 7/1972 | Schulz, Jr. | 264/46.6 X |
| 3,802,010 | 4/1974 | Smith | 9/310 E |
| 3,929,549 | 12/1975 | Smith | 9/310 E X |
| 4,065,337 | 12/1977 | Alter et al. | 264/46.6 X |
| 4,073,049 | 2/1978 | Lint | 264/46.6 X |
| 4,119,583 | 10/1978 | Filip et al. | 264/46.6 X |
| 4,256,803 | 3/1981 | Laurent | 264/46.6 X |
| 4,268,571 | 5/1981 | McCarthy | 264/46.6 X |

FOREIGN PATENT DOCUMENTS

| | | | |
|---|---|---|---|
| 211422 | 10/1957 | Australia | 264/46.6 |
| 242233 | 12/1962 | Australia | 264/46.6 |
| 251057 | 1/1963 | Australia | 264/46.6 |

*Primary Examiner*—Philip E. Anderson
*Attorney, Agent, or Firm*—Edgar W. Averill, Jr.

[57] ABSTRACT

A process for fabricating hollow, foam-filled, reinforced plastic objects such as surfboards. The process involves disassembling a multi-part mold to expose its inner surface. The inner surface is then coated with a gel coat, resin and reinforcing material and assembled into two mold halves. A prefoam material is injected into each mold half which is then capped with a baffle. The foam is then permitted to rise, and a portion of the foam is forced through the baffle. The baffle is then removed and a certain amount of the foam is removed. The two mold halves are joined and a center joining resin is poured in this depression and allowed to cure.

8 Claims, 8 Drawing Figures

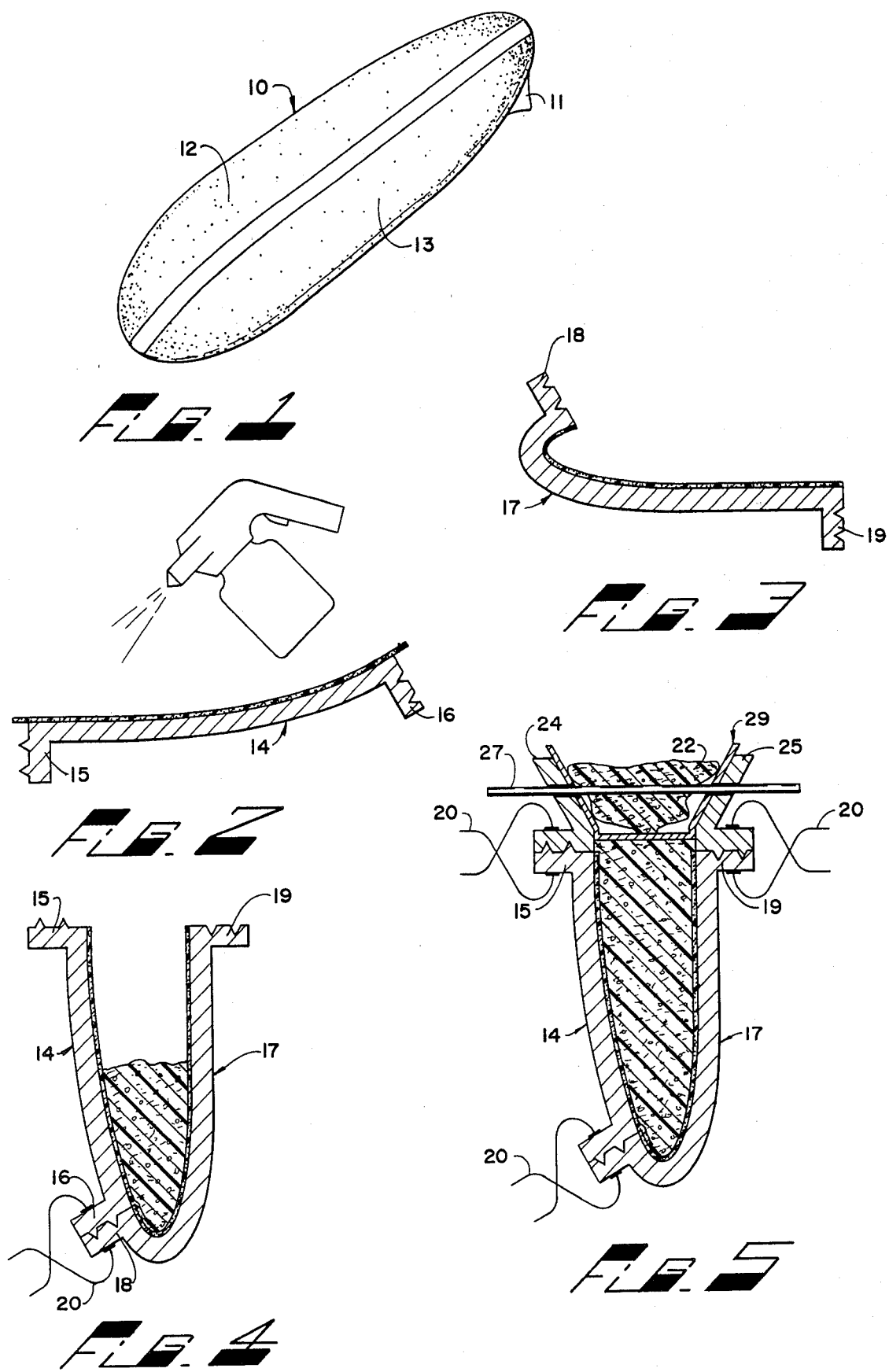

PROCESS FOR FABRICATING A CLOSED, FOAM-FILLED, REINFORCED POLYESTER RESIN SHELL ARTICLE

BACKGROUND OF THE DISCLOSURE

The field of the invention is reinforced, plastic fabrication, and the invention relates more particularly to the fabrication of finished parts having a foam core and a fiberglass-reinforced polyester resin surface. A process for making surfboards is shown in U.S. Pat. No. 3,929,549. A major difficulty with the process shown in the above-referenced patents is the failure of the foam to be in close contact with the resin at all points. Any points where the foam has pulled away from the resin, a soft spot resulted and the board soon became unuseable. Furthermore, because of the shape of the mold, it was difficult to properly coat the inner surface of the mold particularly near the side edges of the board. Still further, it was difficult to place any decorative layer near the outer surface of the board because of the difficulty of placing and trimming such a sheet in a confined hollowed area such as shown in FIG. 4 of U.S. Pat. No. 3,929,549.

Surfboards are commonly made from the inside out. That is, a foam core is shaped to the desired dimensions and then coated with a fiberglass and resin mixture. The outer surface is then smoothed to provide surface gloss. This process requires a considerable amount of hand labor, and a substantial amount of skill to form a board with an acceptable appearance and shape. It has been known for many years that an improved surface gloss could be formed by molding a surfboard in a hollow mold, but processes to accomplish this have not proved entirely successful.

The interest in surfboards has recently been increased by the popularity of motorized surf boards surfboard sailing devices, and a need for a stronger more durable surfboard exists.

SUMMARY OF THE INVENTION

The present invention is for a process for fabricating a closed, foam-filled reinforced polyester surfaced object such as a surfboard. The process comprises the steps of disassembling a mold into sufficient parts so that the surface of each part is readily accessible to be sprayed by a resin spray gun. The mold surfaces are then coated with a liquid resin which may either contain a reinforcing material such as glass fibers or may be later coated with a glass cloth which may either be woven or non-woven. After the resin has been at least partly cured, a prefoam mix is placed into each mold half. Before the prefoam has risen, a baffle is affixed across the entire upper surface of the mold. As the prefoam rises, it meets the lower surface of the baffle and then is forced out through holes in the baffle thereby increasing the internal pressure of the foam and forcing it against the resin outer surfaces. After the foam has cured, the baffle member is removed and a portion of the upper surface of the foam is routed out or otherwise removed so that when the two mold halves are joined, a generally I-beam shaped hollow depression is formed between the two mold halves. The two mold halves are supported in the final desired position and a joining resin such as an epoxy resin is poured into the I-beam shaped depression and the joining resin is permitted to cure.

BRIEF DESCRIPTION OF THE DRAWINGS

FIG. 1 is a perspective view of a surfboard manufactured by the process of the present invention.

FIG. 2 is a cross-sectional view of one of two pieces of a first mold half.

FIG. 3 is a cross-sectional view of the second of two pieces of a first mold half.

FIG. 4 is a cross-sectional view of the mold halves of FIG. 2 and 3 joined together.

FIG. 5 is a cross-sectional view of the mold halves of FIG. 4 with a baffle member clamped to the upper surface thereof.

DESCRIPTION OF THE PREFERRED EMBODIMENTS

Figure 6:
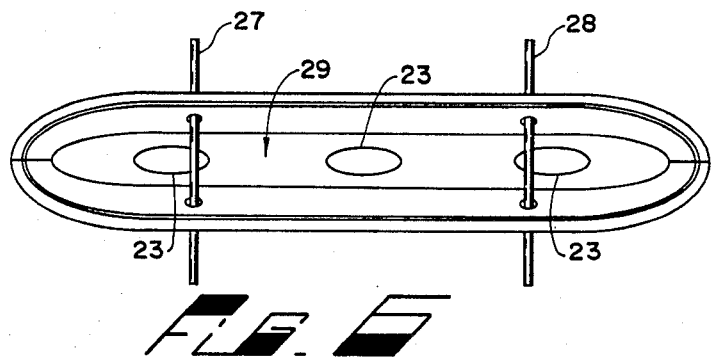
FIG. 6 is a plan view of the baffle member of FIG. 5.

A surfboard generally indicated by reference character 10 is shown in perspective view in FIG. 1. The Surfboard has a fin 11 and has a right side 12 and a left side 13. The surfboard 10 has an outer high gloss gel coat finish and a fiberglass reinforced shell surrounding a foam resin center.

In the past, such surfboards have typically been formed from the inside out. That is, the central foam core is first shaped typically by hand and then coated with the fiberglass and resin mixture followed by a surface resin coating which is sanded and buffed to the desired finish. The problem with such a fabrication system is two fold. First, a large amount of hand labor is required to perform the various steps involved and secondly, the shape of the final surfboard is somewhat inexact because it is dependent upon the skill of the person shaping the foam. It has long been realized that a high-gloss, accurately-shaped member could be made if it could be molded from the outside in, but attempts to form surfboards by this process have not been commercially successful.

A process for making surfboards is disclosed in U.S. Pat. Nos. 3,802,010 and 3,929,549. The process shown therein has not proved commercially successful. It was very difficult to squeegy or otherwise smooth out the resin and fiberglass against the mold because of the impossibilty of getting at the mold surface near the edge of the board.

The present invention ultilizes a process which readily exposes the mold surface, and the mold may be disassembled into four or more parts to permit this ability. The particular mold configuration shown in the drawings is made of four mold parts, the right hand side having two parts and the left hand side having two parts. A mold quarter 14 is shown in FIG. 2. Two flanges 15 and 16 run along the entire length of the two longitudinal edges of mold quarter 14. A resin gun 17 is used to spray the mold surface with resin. Fiberglass cloth, decorative cloth and other resin additives may readily be placed on the upper surface of mold quarter 14. A second mold quarter 17 is shown in FIG. 3 and likewise has two flanges 18 and 19 and is likewise readily accessible by resin gun 17.

Mold quarters 14 and 17 may be joined toegether by holding flanges 16 and 18 together with a series of clamps 20. In practice, the gel coat is sprayed on the mold surfaces and allowed to dry. Next, the fiberglass mat is placed on the gel coat and the woven cloth layed on top. The resin is then added and the air is squeegied out after which the cloth is pulled off the mat to reduce weight. The excess fibers are tapped down with a brush and the resulting resin and fiberglass mixture has maximum strength with minimum weight.

The two mold halves having been coated with gel coat, fiberglass and resin are next joined, and the fiberglass at the edge is raised up from one of the mold halves and an overlapping joint formed. The fiberglass should be trimmed just as it starts to harden and just before the overlapping step. The two mold halves are then clamped together as shown in FIG. 4. The hollow and partly cured fiberglass and resin coated mold is next placed in an oven and heated to approximately 90 degrees. Next, the foam, which should also come out of the foam machine at about 90 degrees is placed in the bottom of the mold as shown in FIG. 4. Next, the baffle shown in FIGS. 5 and 6 is held in place by a pair of rods 27 and 28 which are passed through holes in the baffle 29 and baffle holding members 24 and 25. Next, the foaming reaction which is exothermic takes place, and the foam rises and contacts the lower surface of baffle 29, and a portion of the foam 22 is extruded through the openings 23 in baffle 29.

Figure 7:
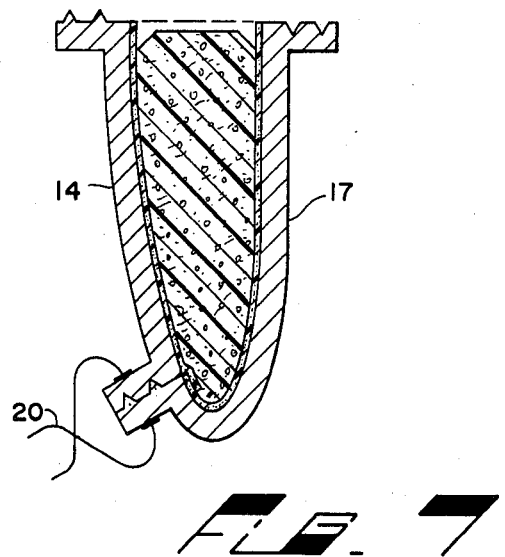
FIG. 7 is a cross-sectional view similar to FIG. 4 with the upper half of the foam cut away.
Figure 8:
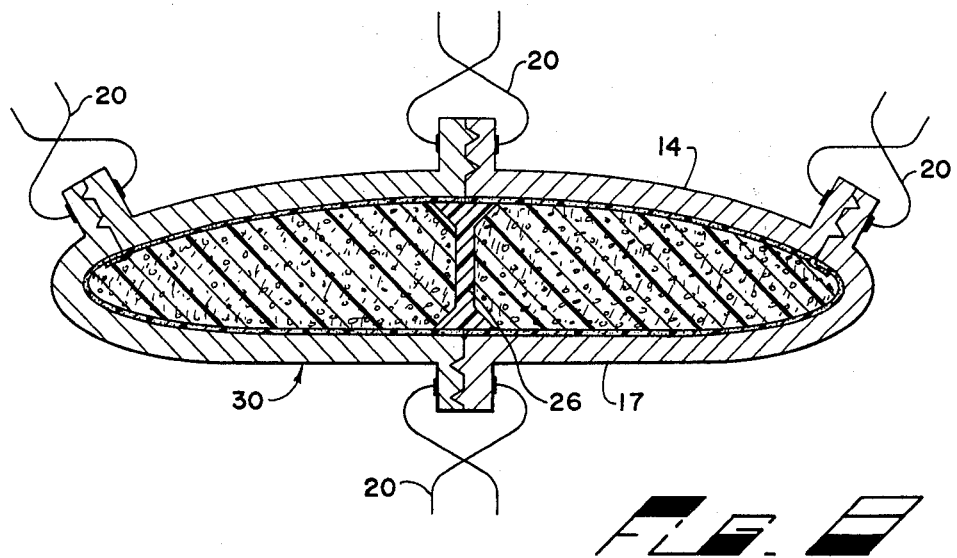
FIG. 8 is a cross-sectional view of the four portions of the mold half joined together.

After the foam and resin have cured, baffle 21 is removed and the upper portion of the foam is cut away as shown in FIG. 7. Note that the inner surface of the fiberglass and resin is exposed. Next, the cut foam surfaces are generously coated with a liquid epoxy resin and the mold half of FIG. 7 is joined to its mating mold half 30 as shown in FIG. 8. Clamps 20 hold half 30 to the half formed by quarters 14 and 17. A liquid epoxy resin is poured into the hollow between the two halves and a generally I-beam shaped resin core 26 is formed which securely holds the two mold halves together and abuts the inner surface of the resin and fiberglass shell. After the core 26 has cured, clamps 20 are removed and the mold is removed from the finished board. One or more inserts may be formed for attachment of a fin and a leash holding fitting and various minor finishing operations are performed such as the removal of a parting line.

Numerous advantages result from the practice of the process of the present invention. For instance, because of the ready access to the mold surface, decorative fabrics may be carefully layed on the surface before the addition of the fiberglass reinforcing. Furthermore, mold polishing and coating operations may be easily carried out. The tongue and groove portions of the flanges securely position the mold parts so that there is no offset between mold halves.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A process for fabricating a closed, foam-filled, reinforced polyester-surfaced object, such as a surfboard, said process comprising the steps of:
    disassembling a mold into at least four parts so that the surface of each part is readily accessible to be sprayed by a resin spray gun the joint between the parts being positioned away from the outer edge of the reinforced polyester-surfaced object;
    coating the surface of each part of the mold with a liquid resin and reinforcing material and allowing the liquid resin to at least partially cure;
    assembling some of the mold parts to form one of the halves of the desired object;
    assembling the remaining mold parts to form the other half of the desired object;
    pouring a prefoam mix into each of the mold halves;
    inserting a baffle member across the entire upper surface of the mold halves before the prefoam has commmpletely risen said baffle member having at least one hole therethrough;
    allowing the prefoam to rise and allowing a portion thereof to pass through the hole in the baffle member;
    removing the baffle member;
    cutting out a portion of the upper surface of the foam so that when the two halves are joined, a generally I-beam shaped hollow depression is formed between the mold halves;
    supporting the two mold halves into the desired final orientation while pouring a joining resin into the generally I-beam shaped depression; and
    permitting the joining resin to cure to form a final part.

2. The process of claim 1 wherein the mold may be disassembled into four main parts.

3. The process of claim 1 wherein the mold parts are held to each other by flanges integral with each mold part.

4. The process of claim 3 wherein the baffle is held to the upper surface of each mold half by a holding member which mates with flanges on the mold half.

5. The process of claim 1 further including the step of coating the mold surfaces with a gel coat before coating the mold surfaces with said resin and reinforcing material.

6. The process of claim 1 wherein the object formed is a surfboard and the joining resin is an epoxy resin.

7. The process of claim 5 further including the step of adding a decorative fabric between the gel coat and the resin and reinforcing material.

8. The process of claim 1 wherein the reinforcing material is a non-woven glass fiber cloth.

* * * * *